US006424973B1

(12) United States Patent
Baclawski

(10) Patent No.: US 6,424,973 B1
(45) Date of Patent: Jul. 23, 2002

(54) SEARCH SYSTEM AND METHOD BASED ON MULTIPLE ONTOLOGIES

(75) Inventor: Kenneth P. Baclawski, Waltham, MA (US)

(73) Assignee: Jarg Corporation, Waltham, MA (US)

( * ) Notice: Subject to any disclaimer, the term of this patent is extended or adjusted under 35 U.S.C. 154(b) by 0 days.

(21) Appl. No.: 09/509,128

(22) PCT Filed: Jul. 23, 1999

(86) PCT No.: PCT/US99/16953

§ 371 (c)(1),
(2), (4) Date: Mar. 23, 2000

(87) PCT Pub. No.: WO00/05664

PCT Pub. Date: Feb. 3, 2000

Related U.S. Application Data

(60) Provisional application No. 60/094,110, filed on Jul. 24, 1998, and provisional application No. 60/094,113, filed on Jul. 24, 1998.

(51) Int. Cl.$^7$ ............................................... G06F 17/30
(52) U.S. Cl. ......................... 707/102; 707/6; 707/104.1
(58) Field of Search ........................ 707/102, 6, 104.1

(56) References Cited

U.S. PATENT DOCUMENTS

| 5,465,982 | A | * | 11/1995 | Rebane ..................... 273/153 R |
| 5,692,184 | A | * | 11/1997 | Ardoin et al. ............. 707/103 R |
| 5,694,593 | A |   | 12/1997 | Baclawski |
| 5,970,490 | A | * | 10/1999 | Morgenstern ................ 707/10 |
| 6,134,532 | A | * | 10/2000 | Lazarus et al. ................ 705/1 |
| 6,154,213 | A | * | 11/2000 | Rennison et al. ........... 345/428 |
| 6,178,416 | B1 | * | 1/2001 | Thompson et al. ............. 707/3 |
| 6,226,666 | B1 | * | 5/2001 | Chang et al. .......... 379/100.08 |
| 6,263,335 | B1 | * | 7/2001 | Paik et al. ..................... 707/5 |

FOREIGN PATENT DOCUMENTS

EP          0882503 A        2/1998

OTHER PUBLICATIONS

Salton, Gerard et al., "Automatic Structuring And Retrieval Of Large Text Files", Communications Of The ACM, Feb. 1994, pp. 97–108, vol. 37, No. 2.

(List continued on next page.)

Primary Examiner—Wayne Amsbury
(74) Attorney, Agent, or Firm—Kudirka & Jobse, LLP

(57) ABSTRACT

A distributed computer database system includes one or more front end computers and one or more computer nodes interconnected by a network into a search engine for retrieval of objects processed by a variety of interrelated ontologies. Each object conforms to a specific ontology. A query is an object which conforms to a specific ontology, which is to be used for retrieval of objects conforming to one or more target ontologies. A query from a user is transmitted to one of the front end computers which forwards the query to one of the computer nodes, termed the home node, of the search engine. The home node extracts features from the query, according to its ontology. These features are then hashed. Each hashed feature and the list of target ontologies is transmitted to one node on the network. Each node on the network which receives a hashed feature uses the hashed feature of the query to perform a search on its respective partition of the database. The results of the searches of the local databases are composed of the object identifiers of objects that match the query and the ontologies within which they were processed, as well as equivalent hashed features within other ontologies. These other hashed features are forwarded, as needed, to their respective nodes, and this process continues until the desired target ontologies are reached. When the target ontologies are reached, the results of the searches of the local databases are gathered by the home node. The results of the query are then computing for each target ontology. This process may be repeated by the home node to refine the results of the query.

22 Claims, 9 Drawing Sheets

OTHER PUBLICATIONS

Chakrabarti, Soumen, et al., "Automatic Resource Compilation by Analyzing Hyperlink Structure and Associated Text", Proceedings 7$^{th}$ International World Wide Web Conference, 1998, <http://decweb.ethz.ch/WWW7/1898/com1898.htm>.

Jain, Ranesh, "Content–Centric Computing in Visual Systems", in Del Bimbo, Alberto, "Image Analysis and Processing", Lecture Notes in Computer Science, 9th International Conference ICIAP '97, Sep., 1997, pp. 1–31, Proceedings, vol. II, Florence, Italy.

Pirolli, Peter et al., "Silk from a Sow's Ear: Extracting Usable Structures From the Web", CHI 96, Apr. 13–18, 1996, pp. 118–125, Vancouver, Canada.

Kleinberg, Jon, "Authoritative Sources in Hyperlinked Environment", Proceedings 9th ACM–SIAM Symposium on Discrete Algorithms, 1998, <http://www.cs.cornell.edu/home/kleinber/auth.pdf>.

Gibson, David et al, "Inferring Web Communities from Link Topology", Proceedings 9th ACM Conference on Hypertext and Hypermedia, 1998, <http://www.cs.cornell.edu/home/kleinber/ht98.pdf>.

Arocena, Gustavo et al., "Applications of a Web Query Language", HYPER Proceedings, Sixth International World Wide Web Conference, LaTeX2 translator Version 96.1, (Feb. 5, 1996), Nikos Drakos, Computer Based Learning Unit, University of Leeds.

Weiss, Ron et al., "HyPursuit: A Hierarchical Network Search Engine That Exploits Content–Link Hypertext Clustering", Hypertext '96, pp. 180–193, Washington, DC, USA.

Rivlin,Ehud et al., "Navigating in Hyperspace: Designing a Structure–Based Toolbox", Communications Of The ACM, pp. 87–97, Feb. 1994, vol. 37, No. 2.

Tversky, Amos et al., "Features of Similarity", Psychological Review, The American Psychological Association, Inc., Jul. 1977, pp. 327–352, vol. 84, No. 4.

White, Howard, "Bibliometrics", Annual Review of Information Science and Technology, pp. 119–186, vol. 24, 1989, Elsevier Science Publishers B.V.

Spertus,Ellen, "ParaSite: Mining Structural Information on the Web", HYPER Proceedings, Sixth International World Wide Conference, <http://decweb.ethz.ch/WWW6/Technical/Paper206/Paper206.html>.

Noy, Natalya Fridman, "Knowledge Representation for Intelligent Information Retrieval in Experimental Sciences", Ph.D. Thesis, Northeastern University, Dec. 1997, pp. 2–67.

Rivest,R., "The MD4 Message Digest Algorithm", Request for Comments: 1186, MIT Laboratory for Computer Science, pp. 1–18, Oct. 1990.

Ohta, Yuichi, "Knowledge–Based Interpretation of Outdoor Natural Color Scenes", Institute of Information Sciences and Electronics, University of Tsukuba, pp. 1–90, Ibaraki 305, Japan.

Fikes, Richard, "Ontologies: What are They, and Where's The Research?", KR'96, Proceedings of the Fifth International Conference, Nov. 5–8, 1996, pp. 652–664.

Santini, Simone, et al., "Image Databases Are Not Databased With Images", in DelBimbo, Alberto, "Image Analysis and Processing", Lecture Notes in Computer Science, 9th International Conference ICIAP '97, Sep. 1997, pp. 38–45, 356–427, Proceedings, vol. II, Florence, Italy.

Salton, Gerard, "Automatic Indexing", Automatic Text Processing: The Transformation, Analysis, and Retreval of Information by Computer, 1989, pp. 275–366, Addison–Wesley Publishing Co.

Hurwicz, Mike, "Take Your Data to the Cleaners", Byte Magazine, CMP Media Inc., Jan., 1997, <http://www.byte.com>.

Weldon, Jay–Louise, et al., "Data Warehouse Building Blocks", Byte Magazine, CMP Media Inc., Jan., 1997, <http://www.byte.com>.

Weiss, Sholom, et al., "What Is Data Mining?", Predictive Data Mining, A Practical Guide, Morgan Kaufmann Publishers, Inc., 1998, pp. 1–58.

Zloof, Moshe M., "Query–By–Example: The Invocation and Definition of Tables and Forms", IBM Thomas J. Watson Research Center, Yorktown Heights, NY.

Wooldridge, Michael, et al., "Intelligent Agents: Theory and Practice", The Knowledge Engineering Review, vol. 10:2, 1995, 115–152.

Campbell, Alistair E., et al., "Algorithms for Ontologiecal Mediation", Department of Computer Science and Center for Cognitive Science, State University of New York at Buffalo, Buffalo, NY.

Baclawski, Kenneth, "An Abstract Model For Semantically Rich Information Retrieval", Northeastern University, College of Computer Science, Boston, MA Mar. 30, 1994.

Giger, H.P., "Concept Based Retrieval in Classical IR Systems", Proceedings of the International Conference on Research and Development in Information Retrieval, NY, NY, ACM, vol. Conf. 11, p. 275–289.

* cited by examiner

QUERY MESSAGE

| 502 HEADER | 503 QID | 504 HQF | 505 VALUE |
|---|---|---|---|
| 506 TARGET KIDs... | | | |

*Figure 5a*

QUERY RESPONSE MESSAGE

| 507 HEADER | 508 QID | 509 OID | 510 WEIGHT |
|---|---|---|---|

*Figure 5b*

OBJECT MESSAGE

| 511 HEADER | 512 QID | 513 OID |
|---|---|---|

*Figure 5c*

OBJECT RESPONSE MESSAGE

| 514 HEADER | 515 QID | 516 OID | 517 LOCATION |
|---|---|---|---|
| 518 FEATURES... | | | |
| 519 ... | | | |

*Figure 5d*

| 520 HEADER | 521 QID | 522 HQF | 523 VALUE |
|---|---|---|---|
| 524 TARGET KIDs... | | | |

*Figure 5e*

INSERT MESSAGE

| 525 HEADER | 526 OID | 527 LOCATION |
|---|---|---|
| 528 FEATURES... | | |
| 559 | | |

*Figure 5f*

INSERT OBJECT MESSAGE

| 530 HEADER | 531 MT | 532 KID1 | 533 KID2 |
|---|---|---|---|
| 534 FEATURE MAPPING | | | |

*Figure 5g*

MEDIATION MESSAGE

SEARCH SYSTEM AND METHOD BASED ON MULTIPLE ONTOLOGIES

RELATED APPLICATIONS

This application is related to and claims priority from copending, commonly assigned U.S. Provisional Application, Serial No. 60/094,110, filed Jul. 24, 1998, and entitled "Search System and Method Based on Multiple, Reusable Ontologies"; and Serial No. 60/094,113, filed Jul. 24, 1998 by Kenneth P. Baclawski, and entitled "Distributed Object Search System and Method"; the disclosures of which are incorporated herein by reference.

FIELD OF THE INVENTION

The invention relates to computer database systems and more specifically to distributed computer database systems.

BACKGROUND OF THE INVENTION

The basis for communication whether it is between people or computer systems is a shared background that allows them to understand each other. This involves sharing both of the following: (1) a language for communication; and (2) a domain conceptualization that defines the shared vocabulary along with relationships that may hold between the concepts denoted by the terms in the vocabulary.

The problem of translation between different languages is important, and many computer systems have been developed for this purpose. Translation between different domain conceptualizations is also important. Translation between domain conceptualizations is called mediation. Domain conceptualizations are also called ontologies. For example, the vocabulary of Americans differs from that of the British even though they share a common language. In the UK, one would say "lift" for what is called an "elevator" in the US. Mediation would be required in order to understand what is being meant by these terms.

For a more complex example, the domain of medicine has a large vocabulary of terms for chemicals, genes, laboratory procedures, diseases, etc. Within medicine there are many subdomains that use different terminology for the same concept. Terminology can also vary from one company to another, and even small groups within a single company can have their own specialized vocabulary. Some will use the term "Munchausen Syndrome" while others prefer "Chronic factitious illness with physical symptoms". Some might even prefer to expand the term "factitious illness" to "intentional production or feigning of symptoms or disabilities, either physical or psychological" to make it understandable to someone with minimal medical background.

The problem of mediation between domain conceptualizations is especially difficult for computer systems because they generally have no mechanism for dealing with miscommunication as a result of misunderstood terminology. For example, conventional search engines simply match words in a query with words in documents. Some search engines consider the possibility of synonymous words, but the fact that the words might belong to different domains is not considered.

For example, suppose that one wishes to find occurrences of "Job" in the Bible. Job is one of the persons mentioned in the Bible, and one of the books in the Bible is named after him. However, modern search engines do not generally understand this, and they will make errors such as matching "Job" with "work" because they regard these two words as synonymous.

Current search engines support only a very limited ontology with just a few concepts. Moreover, the ontology is inflexibly built into the search engine and only one ontology is supported. In general, indexes of current database systems are thus limited to a single ontology.

A collection of documents, data or other kinds of information objects will be called an object database. Information objects can be images, sound and video streams, as well as data objects such as text files and structured documents. Each information object is identified uniquely by an object identifier (OID). An OID can be an Internet Universal Resource Locator (URL) or some other form of identifier such as a local object identifier.

To assist in finding information in an object database, special search structures are employed called indexes. Current technology generally requires a separate index for each attribute or feature. Even the most sophisticated indexes currently available are limited to a very small number of attributes. Since each index can be as large as the database itself, this technology does not function well when there are hundreds or thousands of attributes, as is often the case when objects such as images, sound and video streams are directly indexed. Furthermore, there is considerable overhead associated with maintaining each index structure. This limits the number of attributes that can be indexed. Current systems are unable to scale up to support databases for which there are: many object types, including images, sound and video streams; millions of features; queries that involve many object types and features simultaneously; and new object types and features being continually added.

Further information can be had regarding some of the concepts discussed herein with reference to the following publications:

1 L. Aiello, J. Doyle, and S. Shapiro, editors. *Proc. Fifth Intern. Conf. on Principles of Knowledge Representation and Reasoning.* Morgan Kaufman Publishers, San Mateo, Calif., 1996.

2 K. Baclawski. Distributed computer database system and method, December 1997. U.S. Pat. No. 5,694,593. Assigned to Northeastern University, Boston, Mass.

3 K. Baclawski and D. Simovici. An abstract model for semantically rich information retrieval. Technical report, Northestern University, Boston, Mass., March 1994.

4 A. Campbell and S. Shapiro. Algorithms for ontological mediation. Technical report, State University of New York at Buffalo, Buffalo, N.Y., 1998.

5 A. Del Bimbo, editor. *The Ninth International Conference on Image Analysis and Processing*, volume 1311. Springer, September 1997.

6 N. Fridman Noy. *Knowledge Representation for Intelligent Information Retrieval in Experimental Sciences.* PhD thesis, College of Computer Science, Northeastern University, Boston, Mass., 1997.

7 R. Jain. Content-centric computing in visual systems. In *The Ninth International Conference on Image Analysis and Processing, Volume II*, pages 1–13, September 1997.

8 Y. Ohta. *Knowledge-Based Interpretation of Outdoor Natural Color Scenes.* Pitman, Boston, Mass., 1985.

9 G. Salton. *Automatic Text Processing.* Addison-Wesley, Reading, Mass., 1989.

10 G. Salton, J. Allen, and C. Buckley. Automatic structuring and retrieval of large text files. *Comm. ACM,* 37(2):9–108, February 1994.

11 A. Tversky. Features of similarity. *Psychological review,* 84(4):327–352, July 1977.

The disclosures of the publications referenced in this "Background of the Invention" are incorporated herein by reference.

It would be desirable to provide an information retrieval system that can retrieve information from a database, including documents, images and other forms of multimedia, talking into account ontologies and using a single indexing system, and otherwise overcome many disadvantages and limitations of current systems.

SUMMARY OF THE INVENTION

The invention resides in performing, preferably in parallel over a distributed network of computer nodes, ontology mediation and information retrieval in response to a user query in order to retrieve information objects conforming to target ontologies specified in the query.

Briefly, the invention can provide an information retrieval system for processing a query for word based and non-word based retrieval of information from a database by extracting a number of features from the query according to its ontology, fragmenting each of the features into feature fragments, and hashing each of the feature fragments into hashed feature fragments. The hashed feature fragments can be used in accessing a hash table for obtaining object identifiers therefrom that can be used for obtaining information from the database relevant to the query and to its target ontologies.

In another aspect, the invention resides in an information indexing system for indexing information for facilitated retrieval from a database, by extracting a number of features from the information, fragmenting each of the features into feature fragments, and hashing each of the feature fragments into hashed feature fragments. The hashed feature fragments are used in accessing a hash table for storing object identifiers at locations determined by the hashed feature fragments and the ontology identifiers. The information retrieval apparatus can be implemented in a distributed computer database system.

In general, the term "feature" as used herein means any information or knowledge associated with an information object or derived from the content of the information object, regardless of whether the information object represents a document, image or other multimedia, which has meaning within the applicable domain and conforms to the applicable ontology. Thus, for example, where the information object represents a photographic image of a human face, e.g., for entry in a photography contest, the features of the image include the eyes, nose and mouth because they can be perceived when the image is viewed by the judges. When the same image is used for skin disease diagnosis, the domain and ontology shift, and the features can include even blemishes that are not noticeable with the unaided eye.

More specifically, the distributed computer database system in accordance with an aspect of the invention can include one or more front end computers and one or more computer nodes interconnected by a network into a search engine for retrieval of objects processed by a variety of interrelated ontologies. Each object conforms to a specific ontology. A query is an object that conforms to a specific ontology, which is to be used for retrieval of objects conforming to one or more target ontologies. A query includes the ontology to be used for processing the query and the target ontologies of the objects to be retrieved. A query from a user is transmitted to one of the front end computers which forwards the query to one of the computer nodes, termed the home node, of the search engine. The home node extracts features from the query, according to its ontology. These features are then fragmented and the feature fragments hashed. Each hashed feature fragment and the list of target ontologies is transmitted to one node on the network. For example, a first portion of the hashed feature fragment can be used as an address index to identify the one node. Each node on the network that receives a hashed feature uses the hashed feature fragment of the query to perform a search on its respective partition of the database. For example, a second portion of the hashed feature fragment can be used as an index into the node's local database. The results of the searches of the local databases include the object identifiers (OIDs) of objects that match the query and the ontologies within which they were processed, as well as equivalent hashed features within other ontologies. These other hashed feature fragments are forwarded, as needed, to their respective nodes, and this search process continues on those nodes and is repeated until the desired target ontologies are reached. When the target ontologies are reached, the results of the searches of the local databases are gathered by the home node. The results of the query are then computed for each target ontology. The computation performed can include a similarity function based on the features that are in common with the query as well as the features that are in the query but not in the object. The similarity function is used to rank the objects. The OIDs of the objects that have the largest similarity value are transmitted to the front end node.

The return of the ranked OIDs as just described constitutes a basic level of service, called level 1. If requested, higher levels of service may be provided. For level 2 or level 3 service, the OIDs obtained in the basic service above are transmitted to the nodes on the network by using a portion of each OID as an addressing index. In addition, if level 3 service is requested, the features each object has in common with the query are transmitted along with the OIDs to the same nodes on the network. Each node on the network which receives an OID uses the OID to perform a search on its respective database for the corresponding object information. In level 2 service, auxiliary information is retrieved and transmitted to the front end node. The auxiliary information can include, e.g., the URL of the object or an object summary or both. For level 3 service, a dissimilarity value is computed based on the features that the object possesses but the query does not. The dissimilarity value as well as the auxiliary information about the object are transmitted to the home node. The dissimilarity values are gathered by the home node which uses them to modify the similarity values of the objects obtained in the first level of processing. The modified similarity values are used to rank the objects. The OIDs and any auxiliary information about the objects that have the largest similarity value are transmitted to the front end node. Regardless of the level of service requested, the front end node formats the response to the user based on the OIDs and any auxiliary information transmitted by the home node. For example, if the front end node is a World Wide Web server, then the front end node constructs a page in HTML format containing a reference to a URL and auxiliary information for each object. The front end transmits the formatted response to the user.

Accordingly, the invention can provide an information retrieval system that can retrieve information from a database, including documents, images and other forms of multimedia, taking into account ontologies and using a single indexing system, and otherwise overcome many disadvantages and limitations of current systems. The invention can also provide an information indexing system coordinated with the retrieval system for facilitated retrieval of the information. Such information indexing and retrieval systems can be based on a distributed model and, consequently, highly scalable, versatile, robust and economical.

BRIEF DESCRIPTION OF THE DRAWINGS

The above and further advantages of the invention may be better understood by referring to the following description in conjunction with the accompanying drawings in which:

FIG. 5a–FIG. 5f are block diagrams showing formats for a query message, query response message, object message, object response message, insert message, and insert object message, respectively, as may be used in conjunction with the embodiment of FIGS. 2, 3 and 4;

DETAILED DESCRIPTION OF A PREFERRED EMBODIMENT

At the outset, it may prove useful to describe ontology in more detail. An ontology models knowledge within a particular domain. An ontology can include a concept network, specialized vocabulary, syntactic forms and inference rules. In particular, an ontology specifies the features that information objects can possess as well as how to extract features from objects. The extracted features are used for determining the degree of similarity between a query object and an information object in an object database. Each feature of an information object may have an associated weight, representing the strength of the feature or the degree with which the object has the feature.

Ontologies can be related to one another in several ways, including the following:

Subset: One ontology can be a subset of another. In this case the smaller ontology is called a subontology of the other. An ontology can be a subontology of several other ontologies.

Version: One ontology can be a version of another. As domains evolve, concepts and terminology can change enough that it is necessary to construct a new ontology which does not simply contain the old ontology.

Parallel: A single domain area can have different ontologies. For example, the same company could have different terminology within its development, manufacturing and marketing departments.

Each information object in an object database is assumed to be expressed within a single domain. In other words, there is a particular domain conceptualization (ontology) that allows one to understand the object. However, different objects may be expressed within different ontologies and queries may use different ontologies from the information objects being searched. In addition, a single ontology may contain one or more subontologies, which may be part of (i.e., "used") by several ontologies. Since ontologies may be very large, it can be important to allow them to be built from smaller components. In other words, subontologies constructed for one ontology may be reused by another.

Current technology commonly requires that information retrieval queries be specified in an artificial query language. In the present invention queries to retrieve information objects in the database are in the same format as the information objects themselves. While each information object in the database conforms to a single ontology and each query conforms to a single ontology, a query can specify any number of target ontologies. For reasons of efficiency and performance the present invention does not have a distinct step in which objects or queries are translated from one ontology to another ontology. The translation and the information retrieval are performed in parallel over the distributed network of computer nodes, and objects conforming to all specified target ontologies are retrieved.

Figure 1:
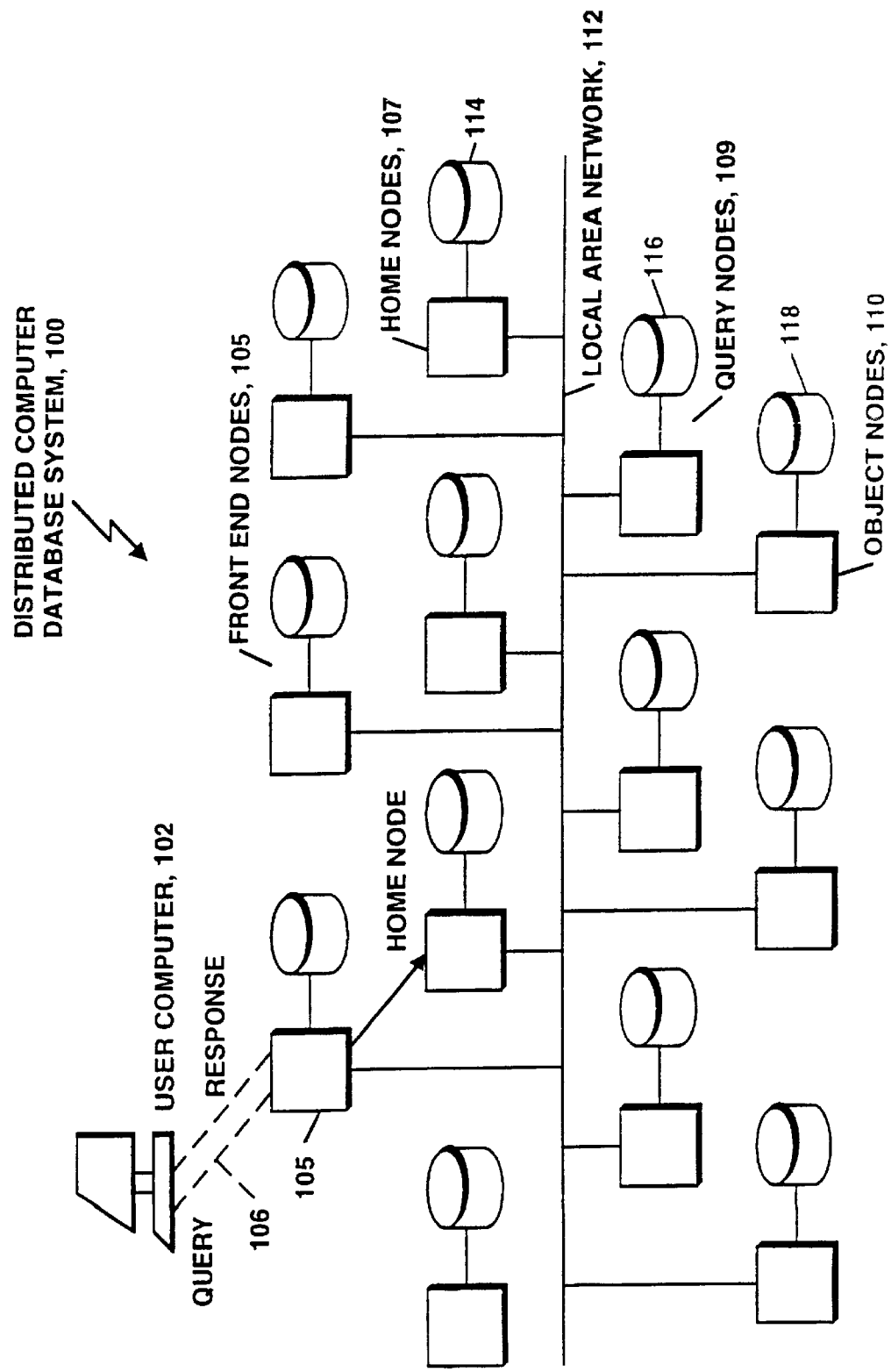
FIG. 1 is a block diagram of an embodiment of the distributed computer database system in accordance with the invention.

Referring now to FIG. 1, in broad overview, one embodiment of a distributed computer database system 100 of the invention includes a user computer 102 in communication with a front end computer 105, e.g., through a network 106. The front end computer 105 (which may also be the user computer in other embodiments of the invention) is in turn in communication with a search engine that includes one or more computer nodes 107, 109, 110 interconnected by a local area network 112. The individual computer nodes 107, 109, 110 may include local disks 114, 116, 118, or may, alternatively or additionally, obtain data from a network disk server (not shown).

The computer nodes 107, 109, 110 of the search engine may be of several types, including home nodes 107, query nodes 109, and object nodes 110. The nodes 107, 109, 110 of the search engine need not represent distinct computers. In one embodiment, the search engine is composed of a single computer that takes on the roles of all home nodes 107, query nodes 109, and object nodes 110. In another embodiment, the search engine is composed of separate computers for each home node 107, query node 109 and object node 110. Those skilled in the art will realize many variations are possible which will still be within the scope and spirit of the present invention.

Figure 2:
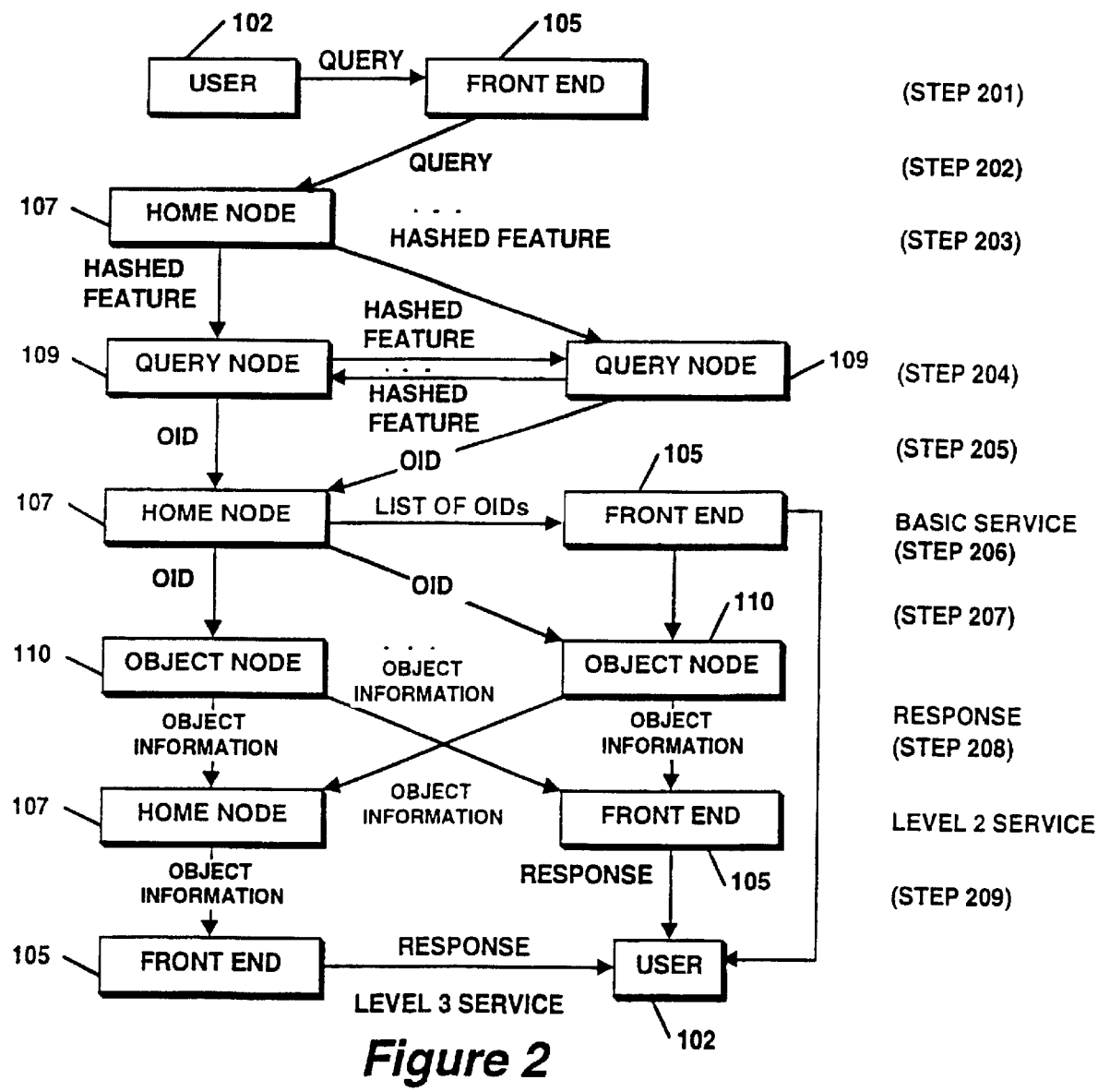
FIG. 2 is a block diagram of the distributed computer database system of FIG. 1 in flow chart form, which illustrates a method of processing queries at different levels of service and returning results in accordance with an embodiment of the invention.

Considering the processing of a query first, and referring also to FIG. 2, in one embodiment when a user transmits (Step 201) a query from the user computer 102, the front end computer 105 receives the query. The front end computer 105 is responsible for establishing the connection with the user computer 102 to enable the user to transmit a query and to receive a response in an appropriate format. The front end computer 105 is also responsible for any authentication and administrative functionality. In one embodiment, the front end computer 105 is a World Wide Web server communicating with the user computer using the HTTP protocol.

After verifying that the query is acceptable, the front end computer 105 performs any reformatting necessary to make the query compatible with the requirements of the search engine. The front end computer 105 then transmits the query to one of the home nodes 107 of the search engine (Step 202), which is then defined as the home node of the search engine for that query.

The home node 107 extracts features from the query according to the ontology. Feature extraction may be performed using traditional techniques for associating values to attributes, such as in relational database records. Features are extracted from structured documents by parsing the document to produce a data structure, then dividing this data structure into (possibly overlapping) substructures called fragments. The fragments of a structured document are the features extracted from the document. Fragments of a query are used to find matching fragments in the database, so they are also called probes. This same terminology will be used for features extracted from other kinds of objects as well.

Features are extracted from unstructured documents by using knowledge extraction techniques. Knowledge extraction produces a data structure composed of a collection of inter-related component data structures. The component data structure is then divided into (possibly overlapping) substructures, as in the case of a structured document, and these substructures are the fragments of the unstructured document.

A large variety of feature extraction algorithms have been developed for media such as sound, images and video streams. Fourier and Wavelet transformations as well as many filtering algorithms are used. Features can also be added to an object by manual or semi-automated means. Such added features are referred to as annotations or meta-data. Features are extracted from annotations using one of the techniques mentioned above, depending on whether the annotation is a relational database record, a structured document or an unstructured document. Each feature can have a value associated with it, and one can specify relationships between features which can also have values associated with them. For example, one feature can be contained within another feature or be adjacent to another feature. The ontology specifies the feature extraction algorithms as well as the structure of the features.

If a feature occurs very commonly in the database, then it does not contribute to the purpose of the search engine; namely, distinguishing those objects that are similar to a particular query. An example is the brightness of an image. Such a feature will be partitioned into a collection of contiguous, non-overlapping ranges of the value associated with the feature rather than the feature itself. Each range of the value is then regarded as a separate feature. When the features of a query are extracted, features that represent value ranges near, but not including, the value of the feature in the query are also included as features of the query, but with smaller strength than the feature representing a value range that includes the value of the feature in the query. The value ranges for a particular feature can either be specified explicitly in the ontology, or they can be constructed dynamically as objects are indexed by the search engine.

The home node 107 then encodes each feature of the query by using a predefined hashing function. Data in the system was previously stored locally on the various query nodes 109 using this hashing function to generate an index to the data in the local database. Thus, the use of the same hashing function to generate an index for data storage and to generate hashed probes for a data query assures that (1) data is distributed uniformly over the query nodes 109 of the search engine during the storing of data and (2) the probes are scattered uniformly over the query nodes 109 during the processing of a query.

In one embodiment, the hash value resulting from the use of the hashing function has a first portion which serves to identify the query node 109 to which the data is to be sent to be stored or to which a query feature is to be sent as a probe and a second portion which is the local index value which is used to determine where data is to be stored at or retrieved from the query node 109. Thus, in terms of a query, the hashed query features are distributed (Step 203) as probes to certain query nodes 109 of the search engine, as determined by the first portion of the hash value. It should be noted that the information objects themselves need not be stored in the database system itself so long as their locations are available in the database system. For example, each document in the World Wide Web is located using its Universal Resource Locator (URL).

At a first or basic service level, query nodes 109 whose probes match the index features by which the data was initially stored on that query node 109 respond to the query in one or both of the following ways:

If the ontology mapping of a hashed query fragment matches one of the specified ontology mappings, the hashed query fragment is transmitted (Step 204) to the query node 109 of the search engine, as determined by the first portion of the hash value. This query node 109 repeats this process.

If the ontology of an OID matches one of the target ontologies, the OID is transmitting (Step 205) to the home node 107.

Thus all matches between the hashed probes, mapped to target ontologies, and the local hash table of index terms are returned or gathered to the home node 107 that initially received the query.

The home node 107 then determines the relevance of each object returned in the search. This determination of relevance is made by the home node 107 by comparing the degree of similarity between the query and the objects whose OIDs were returned. The determination of relevance is made separately for the objects belonging to each target ontology. In one embodiment the measure of similarity between the query and the object is a cosine measure and is given by the expression COS(v,w), where the vector v denotes the query and the vector w denotes the object. These vectors are in a space in which each fragment represents one dimension of the space.

Another commonly used measure of similarity between two objects is a distance function in the same space mentioned above for the cosine measure. However, there is convincing evidence that human similarity does not satisfy the axioms of a distance function. The model that currently seems to be the most successful approach is the Feature Contrast Model of Tversky, referenced above. In this model, the similarity between a query and an object is determined by three terms:

1. The features that are common to the query and the object.
2. The features of the query that are not features of the object.
3. The features of the object that are not features of the query.

The first term contributes a positive number to the similarity value, while the second and third terms have negative contributions. In addition the second and third terms are multiplied by predefined constants such that a feature in the second and third set has less effect on the similarity than one in the first set.

In one embodiment the measure of similarity between the query and the object is a measure determined by three predefined constants that are used to multiply the three terms occurring in the Feature Contrast Model. In this embodiment, if the level of service is specified to be either basic or level 2, then only the first two terms of the Feature Contrast Model are used to compute the measure of similarity, or equivalently, the predefined constant for the third term is set to zero. Since the third term is the least important, it has only a small effect on the ranking of the objects that are retrieved. If all three terms are to be used, then level 3 service can be requested.

In one embodiment the N objects with the highest similarity in each target ontology are returned. In another embodiment all objects which generate similarity values greater than a predetermined value are considered sufficiently similar to the query to be returned to the user as relevant information.

Once the similarity is determined, the home node 107 orders the OIDs according to their degree of similarity in each ontology, and then returns a set of lists of the most relevant OIDs, each list containing the most relevant OIDs for one ontology. In one embodiment the set of lists of the most relevant OIDs is transmitted to the front end computer 105 (Step 205), which formats the response appropriately and transmits the response to the user. In another embodiment the set of lists of the most relevant OIDs is transmitted directly to the user computer by way of the network without the intervention of the front end computer 105.

Alternatively, for higher levels of service (level 2 and level 3), the home node 107 transmits the most relevant OIDs to the object nodes 110 (Step 206) which hold information associated with the objects identified by the OIDs. In one embodiment, the information associated with each object is the URL for the object. In another embodiment, the information associated with each object is the object itself. In another embodiment, the information associated with each object is the list of all features of the object and the values of the features for those features that have associated values.

In one embodiment, the OIDs have a first portion which serves to identify the object node 110 on which the object information is stored and a second portion which is the local index value which is used to determine where the object information is stored in a local table at the object node 110.

For level 2 service, the object nodes 110 return the object information of the most relevant objects. In one embodiment the object information of the most relevant objects is transmitted to the front end computer 105 (Step 207), which formats the response appropriately and transmits the response to the user. In another embodiment the object information of the most relevant objects is transmitted directly to the user computer by way of the network without the intervention of the front end computer 105.

For level 3 service, the object nodes 105 transmit the object information of the most relevant objects to the home node 107 (Step 207). The home node 107 uses the object information of the relevant objects to re-compute the measure of similarity between the query and the objects. This may result in the objects being arranged in a different order for each target ontology, and may also result in a different list of objects being returned for each target ontology. In one embodiment, the measure of similarity utilizes the Feature Contrast Model and all three terms have nonzero predefined constants. In this embodiment, the object information contains a list of the features of the object so that features of the object that are not features of the query may be included in the measure of similarity.

For level 3 service, the home node 107 returns the object information of the most relevant objects. In one embodiment the object information of the most relevant objects is transmitted to the front end computer 105 (Step 208), which formats the response appropriately and transmits the response to the user. In another embodiment the object information of the most relevant objects is transmitted directly to the user computer 102 by way of the network without the intervention of the front end computer 105.

Figure 3:
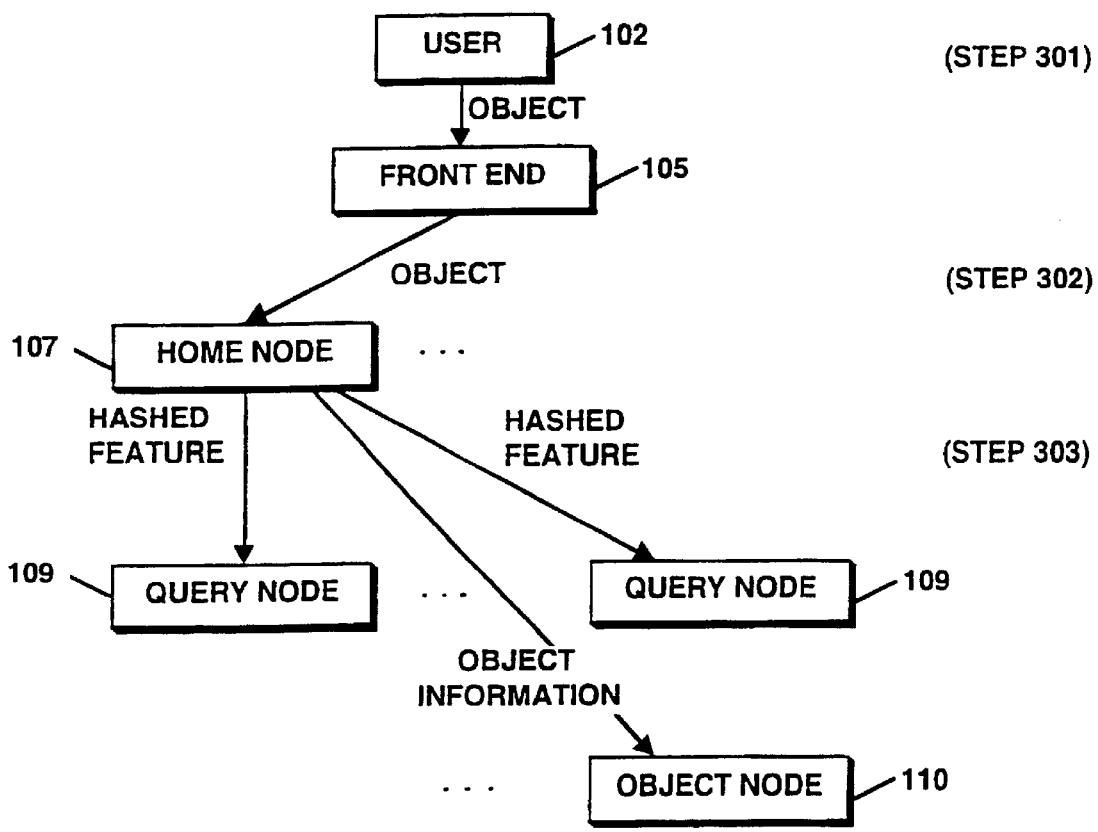
FIG. 3 is a block diagram of the distributed computer database system of FIG. 1 in flow chart form, which illustrates a method of indexing and storing data associated with an information object in accordance with an embodiment of the invention.

Considering next the indexing of an object, and referring also to FIG. 3, in one embodiment when a user transmits (Step 301) an object from the user computer 102, the front end computer 105 receives the object. The front end computer 105 is responsible for establishing the connection with the user computer 102 to enable the user to transmit an object. In another embodiment the front end computer 105 automatically examines objects in its environment for indexing by the search engine without interaction with a user.

The front end computer 105 selects a home node 107 and transmits the object to the selected home node 107(Step 302). In one embodiment, the selection of a home node 107 is done randomly so as to evenly distribute the workload among the home nodes 107. The home node 107assigns a unique OID to the object, then processes the object as discussed above in the case of a query (Step 303), except that data associated with the object is stored in the query nodes 109 and an object node 110.

Figure 4:
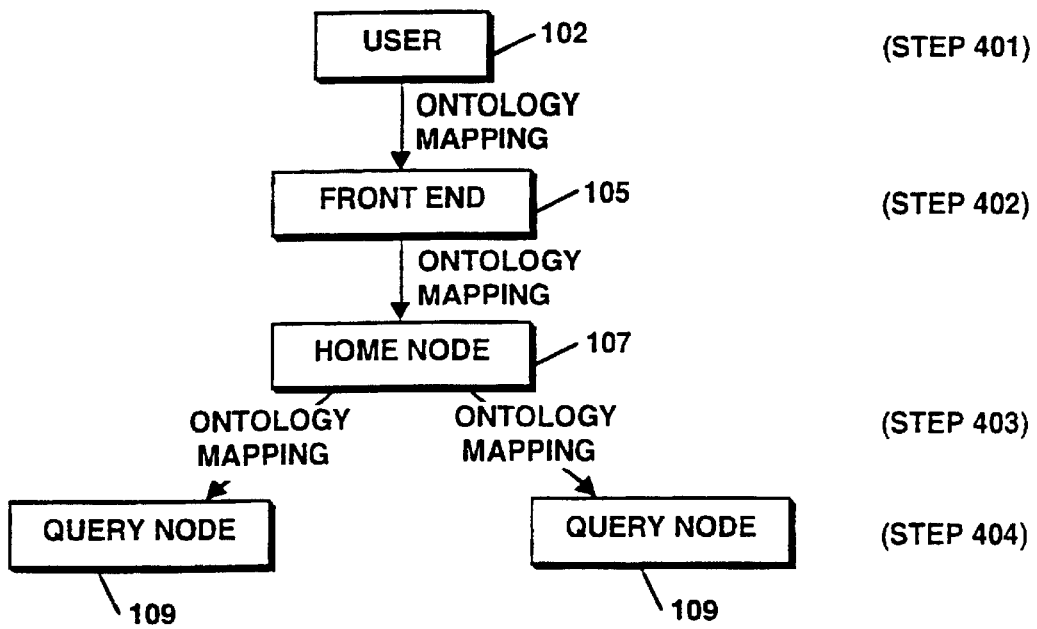
FIG. 4 is a block diagram of the distributed computer database system of FIG. 1 in flow chart form, which illustrates a method of storing data associated with an ontology or associated with a mapping between ontologies.

Considering last the processing of an ontology mediation, and referring also to FIG. 4, in one embodiment when a user transmits (Step 401) an ontology mediation from the user computer 102, the front end computer 105 receives the ontology mediation. The front end computer 105 is responsible for establishing the connection with the user computer 105 to enable the user to transmit an ontology mediation.

The front end computer 105 selects a home node 107 and transmits the ontology mediation to the selected home node 107 (Step 402). The home node 107 constructs a feature mapping that implements the ontology mediation and transmits the feature mapping to every query node 109 (Step 403). Each query node 109 stores the feature mapping in a local table. A background process is then started on each query node 109 to examine every hashed object fragment and to store the mapped hashed object fragments if the feature mapping applies to it (Step 404). This local table is consulted whenever a new hashed object fragment is stored as described above and referring also to FIG. 3.

Considering next the message formats used in the preferred embodiment, and referring also to FIG. 5a, a Query Message in an exemplary format has two parts: Identifier and Target. The Identifier part has four fields: Header 502, Query Identifier (QID) 503, Hashed Query Fragment (HQF) 504 and Value 505. The Header field 502 specifies that this message is a Query Message and also specifies the destination query node. The destination query node is determined by the first portion of the hashed query fragment. The QID field 503 contains a query type specifier and a query identifier. The query type specifier determines the ontology in which the query was specified. The HQF field 504 contains a fragment type specifier and the second portion of the hashed query fragment produced by the Hashing Module. The Value field 505 contains an optional value associated with the fragment. The fragment type specifier determines whether the Query Message contains a Value field 505, and if the Query Message does contain a Value field then the fragment type specifier determines the size of the Value field. The Target part contains a list 506 of target ontology identifiers. An ontology is also called a knowledge model, and an ontology identifier is abbreviated KID.

As shown in FIG. 5b, the Query Response Message in an exemplary format contains four fields: Header 507, QID 508, Object Identifier (OID) 509, and Weight 510. The Header field 507 specifies that this message is a Query Response Message and also specifies the destination home node. The destination home node is the home node from which the corresponding Query Message was received. The QID field 508 contains a query type specifier and a query identifier. The OID field 509 contains an object type specifier and an object identifier. The object type specifier determines the ontology in which the object was processed. The Weight field 510 contains an optional weight associated with the object. The object type specifier determines whether the Query Response Message contains a Weight field 510, and if the Query Response Message does contain a Weight field then the object type specifier determines the size of the field.

As shown in FIG. 5c, the Object Message in an exemplary format has three fields: Header 51 1, QID 512, and OID 513. The Header field 511 specifies that this message is an Object Message and also specifies the destination object node. The destination object node is determined by the first portion of the object identifier. The QID field 512 contains a query type specifier and a query identifier. The OID field 513 contains an object type specifier and the second portion of the object identifier.

As shown in FIG. 5d, the Object Response Message in an exemplary format has three parts: Identifier, Feature and Auxiliary. The Identifier part has four fields: Header 514, QID 515, OID 516, and Location 517. The Header field 514 specifies that this message is an Object Response Message and also specifies the destination home node. The destination home node is the home node from which the corresponding Object Message was received. The QID field 515 contains a query type specifier and a query identifier. The OID field 515 contains an object type specifier and the object identifier. The Location field 517 contains an optional location specifier such as a URL. The object type specifier determines whether the Object Response Message contains a Location field 517, and if the Object Response Message does contain a Location field, then the object type specifier determines the size of the Location field. The Feature part contains a number of fields 518 for containing a number of features associated with the object. The Auxiliary part contains a number of fields 519 for containing auxiliary information associated with the object. The object type specifier determines whether the Object Response Message contains an Auxiliary part, and if the Object Response Message does contain an Auxiliary part, then the object type specifier determines the size and structure of the Auxiliary part.

As shown in FIG. 5e, the Insert Message in an exemplary format has two parts: Identifier and Target. The Identifier part has four fields: Header 520, OID 521, HQF 522, and Value 523. The Header field 520 specifies that this message is an Insert Message and also specifies the destination query node. The destination object node is determined by the first portion of the hashed query fragment. The OID field 521 contains an object type specifier and the object identifier. The HQF field 522 contains a fragment type specifier and the second portion of the hashed query fragment produced by the Hashing Module. The Value field 523 contains an optional value associated with the fragment. The fragment type specifier determines whether the Query Message contains a Value field 523, and if the Query Message does contain a Value field then the fragment type specifier determines the size of the Value field. The Target part contains a list 524 of target ontology identifiers.

As shown in FIG. 5f, the Insert Object Message in an exemplary format has three parts: Identifier, Feature and Auxiliary. The Identifier part has three fields: Header 525, OID 526, and Location 527. The Header field 525 specifies that this message is an Insert Object Message and also specifies the destination object node. The destination object node is determined by the first portion of the object identifier. The OID field 526 contains an object type specifier and the second portion of the object identifier. The Location field 527 contains an optional location specifier such as a URL. The object type specifier determines whether the Insert Object Message contains a Location field 527, and if the Insert Object Message does contain a Location field, then the object type specifier determines the size of the Location field. The Feature part has a number of fields 528 for containing a number of features associated with the object. The Auxiliary part contains auxiliary information associated with the object. The object type specifier determines whether the Insert Object Message contains an Auxiliary part, and if the Insert Object Message does contain an Auxiliary part, then the object type specifier determines the size and structure of the Auxiliary part.

As shown in FIG. 5g, the Mediation Message has two parts: Identifier and Mapping. The Identifier part has four fields: Header 530, MT 531, KID1 532, and KID2 533. The Header field 530 specifies that this message is a Mediation Message and also specifies the destination query node. The Mediation Type (MT) field 531 contains a mediation type specifier. The KID1 field 532 contains the ontology identifier of the originating ontology from which the mediation takes place. The KID2 field 533 contains the ontology identifier of the target ontology to which the mediation maps. The Mapping part contains a field 534 containing the feature mapping specification. The structure and size of the feature mapping specification is determined by the MT field.

Figure 6:
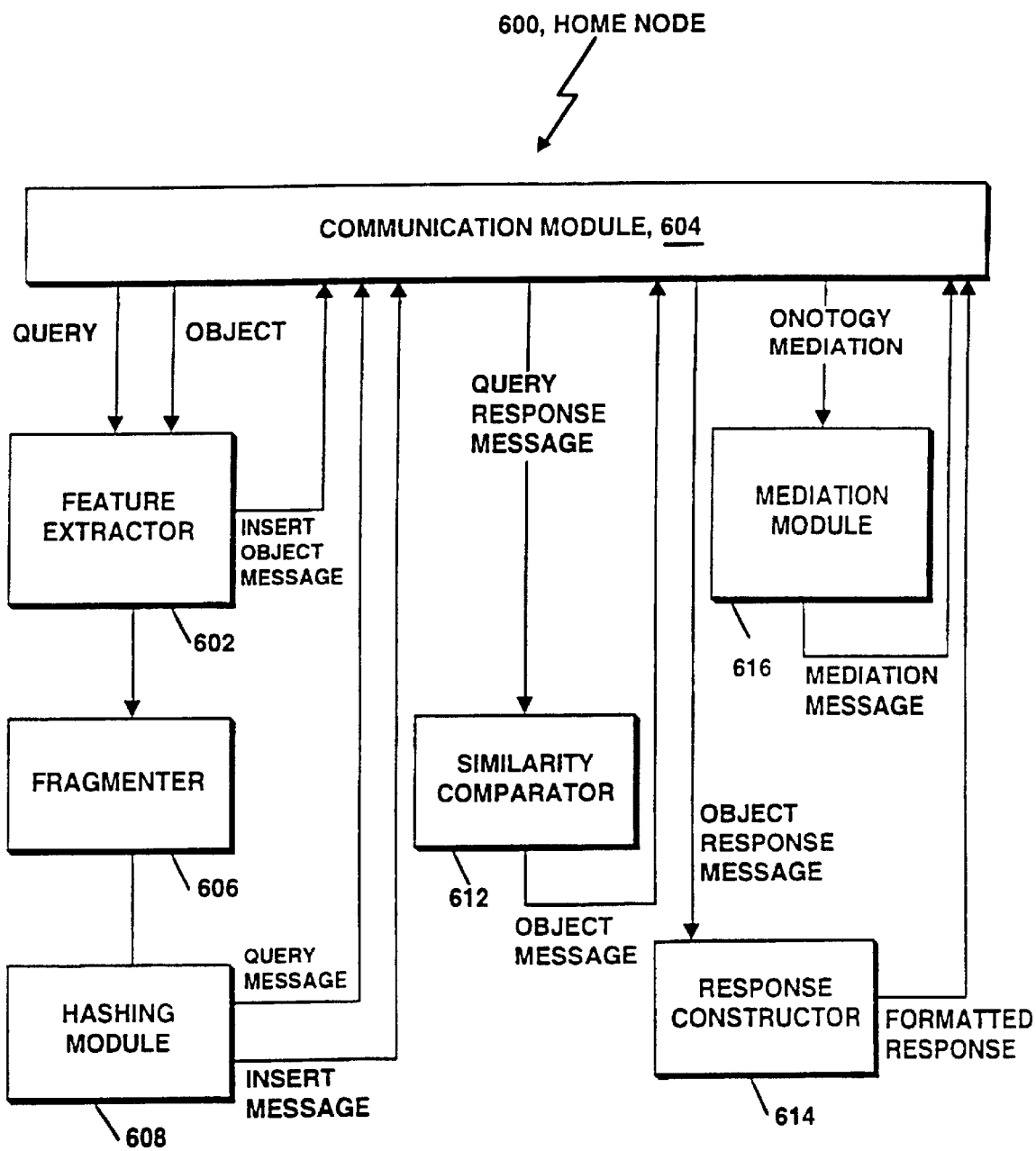
FIG. 6 is a block diagram of a representative one of the home nodes of FIGS. 1, 2, 3 and 4 in accordance with an embodiment of the invention.

Each node of the distributed computer database system includes a Communication Module, discussed below and shown in FIGS. 6, 7a and 7b, responsible for transmitting and receiving messages from one node to another. Transmission of a message requires (1) enqueuing of the message prior to transmission over the communication medium, (2) actual transmission over the communication medium, and (3) enqueuing a task to process the message when the message is received by the module determined by the message type. The message type determines the command that is issued to the receiving module. The command determines the means by which the message is to be processed by the module. The destination node for a message to be transmitted is specified in the Header field of each message. When a message is received from another node, the type of message determines which module in the node will process the message. The message type is also specified in the Header field of each message. The Communication Module of a home node is also responsible for communication with the Front End nodes. A Front End node transmits queries, objects and ontology mediations to the home node, and the home node transmits results, such as formatted tables, to the Front End node.

Considering next exemplary embodiments of the nodes discussed above, and also referring to FIG. 6, a home node 600 can have a Feature Extractor 602 that extracts features from a query or object received from a communication module 604. Feature extraction for images is performed by detecting edges, identifying the image objects, classifying the image objects as domain objects and determining relationships between domain objects. In another embodiment, feature extraction for images is performed by computing Fourier or wavelet transforms from images and sound. Video streams comprise a sequence of images and a synchronized sound track. In addition to feature extraction from the individual images and sound track, video streams can be organized into scenes; domain objects in successive images can be identified with one another and domain objects of the sound track can be related to domain objects in the corresponding scenes. Features extracted from video streams can also include these domain objects. Each Fourier or wavelet transform constitutes one extracted feature. The Feature Extractor 602 is also responsible for selecting target ontologies based on specifications in the query or object. The extracted features and target ontology identifiers are transferred to a Fragmenter 606. In addition, when features have been extracted from an object, the features are transferred to the Communication Module 604 in the form of an Insert Object Message.

The Fragmenter 606 computes the fragments contained in each feature. Each fragment is composed of a bounded set of related components in the feature. In one embodiment, the fragments of a feature are composed of each attribute and each relationship in the data structure defining the feature. The fragments and target ontologies are transferred to a Hashing Module 608.

The Hashing Module computes a hash function of a fragment. In one embodiment, the hash function is the MD4 Message Digest algorithm, as set forth in a specification, Request for Comment (RFC) 1186, published by the Network Working Group of the Internet Engineering Task Force, October, 1990, and available over the Internet or from R. Rivest at the MIT Laboratory for Computer Science, Cambridge, Mass., USA. The Hashing Module 608 transfers either a Query Message or an Insert Message to the Communication Module 604, depending on whether the fragment is a query fragment or an object fragment, respectively.

A Similarity Comparator 612 receives Query Response Messages and produces Object Messages which are transferred to the Communication Module 612. The Similarity Comparator 612 gathers all the query responses for a query. For each object in the responses, the Similarity Comparator 612 determines the relevance of each object returned in the search. This determination of relevance is made by the home node by comparing the degree of similarity between the query and the objects whose OIDs were returned. In one embodiment the measure of similarity between the query and the object is a cosine measure and is given by the expression COS(v,w), where the vector v denotes the query and the vector w denotes the object. These vectors are in a space in which each fragment represents one dimension of the space. The most relevant OIDs are transferred to the Communication Module 604 using an Object Message.

A Response Constructor 614 receives Object Response Messages. It formats a response by collecting all the Object Response Messages having the same QID field. In one embodiment, each Object Response Messages results in one row of the formatted table. The entries in the row are determined by each feature of the Features part of the Object Response Message. In addition, one entry in the row specifies the Location field. The arrangement of the rows within the table is determined by the Auxiliary parts of the Object Request Messages. The formatted response is transmitted to the front end from which the query was received.

A Mediation Module 616 receives ontology mediation specifications and transmits Mediation Messages. Ontology mediation maps terminology in one ontology, called the originating or source ontology, to terminology in another ontology, called the target or destination ontology. The Mediation Module 616 determines the identifiers of the originating and target ontologies. The mediation specification determines a number of feature mappings. For example, "Munchausen Syndrome" in a medical ontology could be mapped to "Chronic intentional production of symptoms or disabilities, either physical or psychological" in another ontology. Each mediation specification is expressed as a feature mapping. There can be many types of mediation specification, such as definitions, ingredients and procedures. The mediation type determines the type of the mediation specification and the feature mapping. The Mediation Module 616 constructs a Mediation Message for each query node. These Mediation Messages are identical except for the destination query node specified in the Header field. Each Mediation Message is transferred to the Communication Module 604.

Figure 7A:
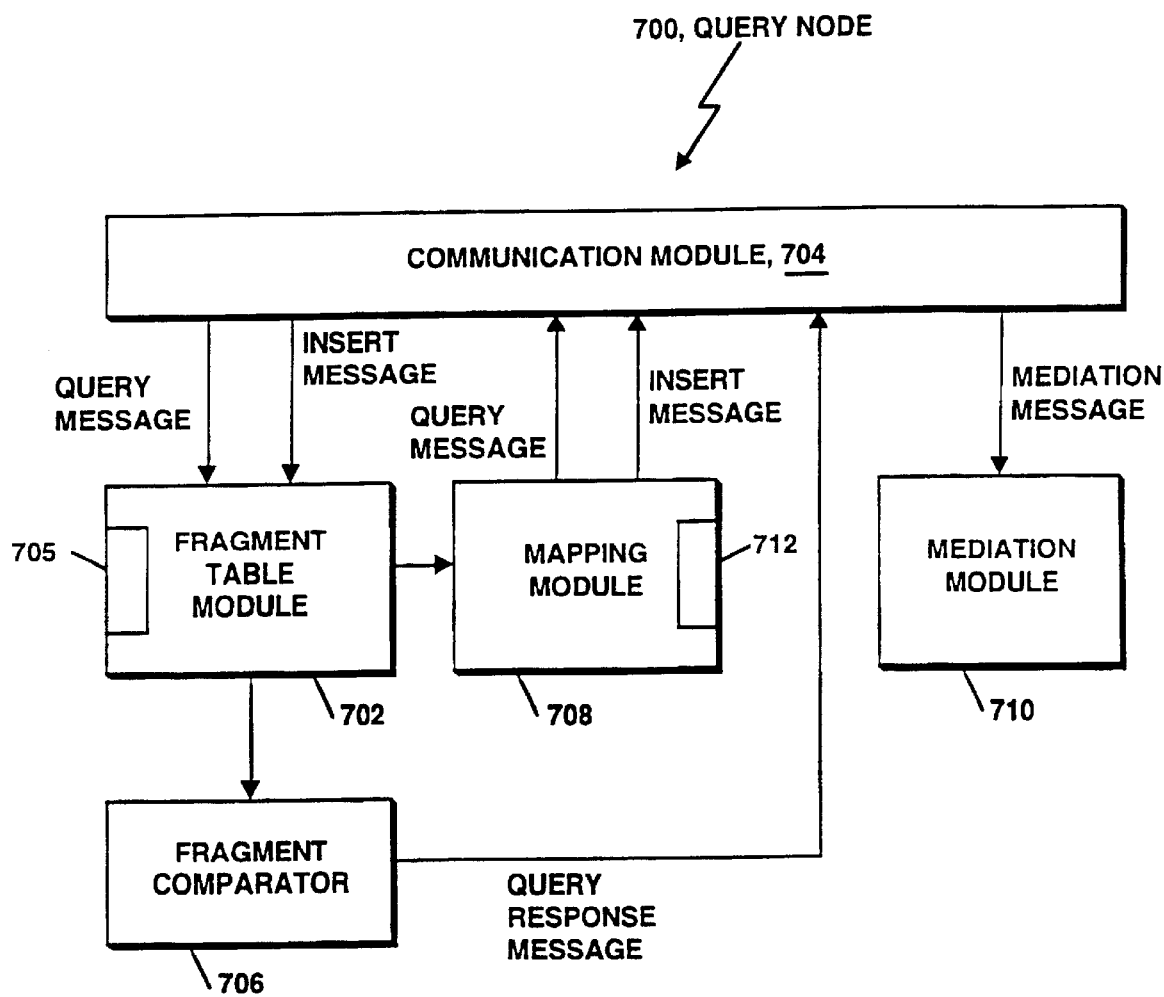
FIG. 7a is a block diagram of a representative one of the query nodes of FIGS. 1, 2, 3 and 4 in accordance with an embodiment of the invention.
Figure 7B:
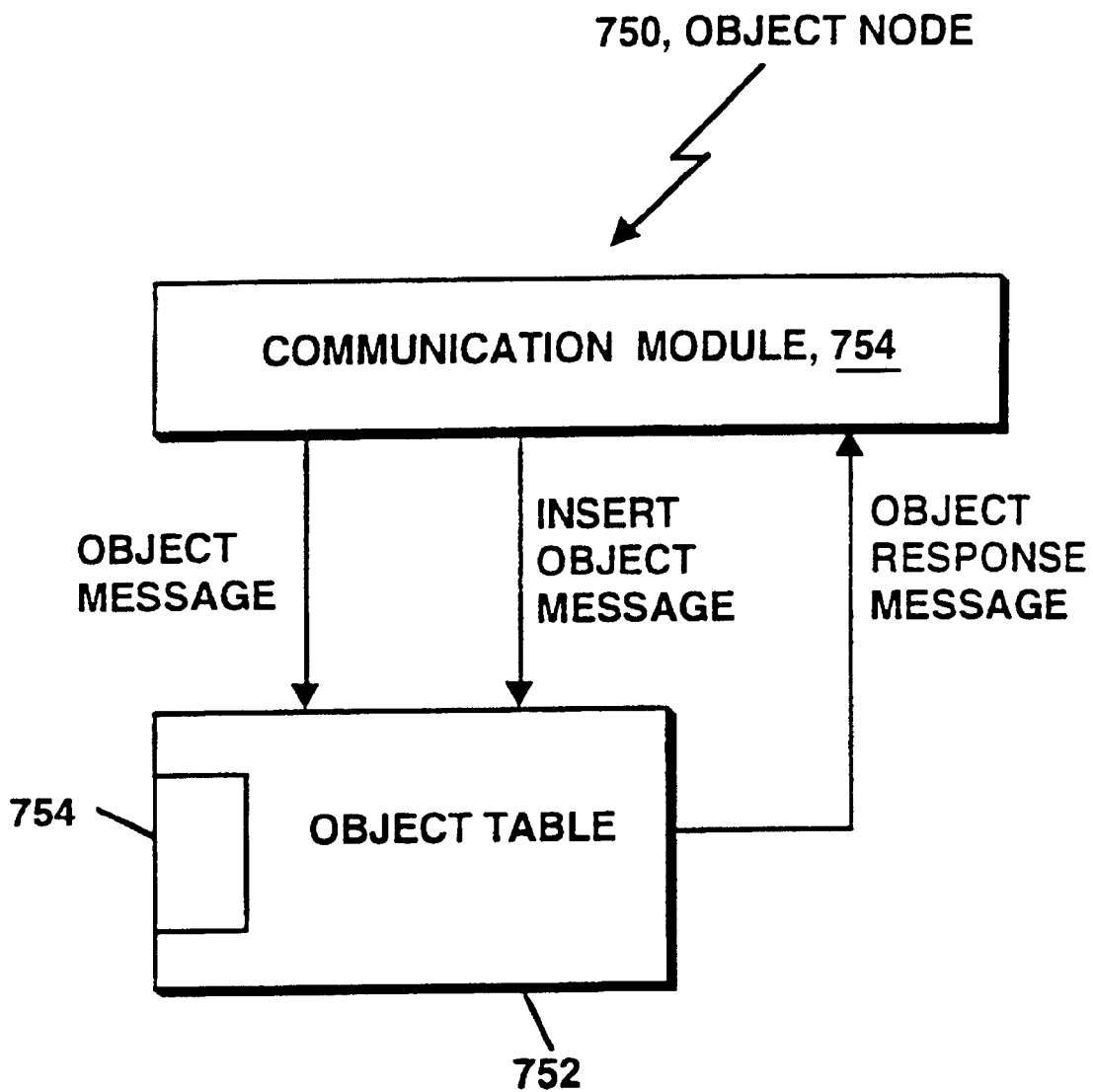
FIG. 7b is a block diagram of a representative one of the object nodes of FIGS. 1, 2, 3 and 4 in accordance with an embodiment of the invention.

Referring to FIG. 7a, a query node 700 can have a Fragment Table Module 702 that receives Query Messages and Insert Messages from a communication module 704. In the case of a Query Message the Fragment Table retrieves an entry in the local hash table 705 using the hash value in the HQF field. The type specifier in the HQF field and the entry in the local hash table 705 are transferred to a Fragment Comparator 706. If there are any target KIDs in the Query Message and if the entry specifies a mapping from the ontology of the entry to one of the target KIDs, then the Query Message and the entry are transferred to a Mapping Module 708.

In the case of an Insert Message, the Fragment Table module 702 modifies an entry in the local hash table 705 by inserting the OID and Value fields of the Insert Message to the entry in the local hash table 705. If there are any target KIDs in the Insert Message, then the Insert Message is transferred to the Mapping Module 708.

The Fragment Comparator 706 receives entries from the Fragment Table module 702. A comparison function is determined by the HQF type specifier that was transferred from the Fragment Table module 702. The comparison function is used to determine the relevance of the OID and Value fields in the entry that was transferred from the Fragment Table module 702. In one embodiment, the comparison function determines a similarity weight, and the OIDs having the highest similarity weight are deemed to be relevant. The relevant OIDs and their similarity weights are transferred to the Communication Module 704 using a Query Response Message.

The Mapping Module 708 receives Query Messages and Insert Messages from the Fragment Table module 702. For a Query Message, the Mapping Module 708 constructs a number of Query Messages for each target ontology specified by a target KID. When there is no direct mapping from the originating ontology to the target ontologies, the constructed Query Message will contain target KIDs. In this case the mapping proceeds through intermediate ontologies and requires several stages to reach the target ontology. For an Insert Message, the Mapping Module 708 constructs a number of Insert Messages for each target ontology specified by a target KID, using the feature mapping in the local table of feature mappings.

A Mediation Module 710 receives Mediation Messages. For each Mediation Message, a background process is initiated that is responsible for examining every hashed object fragment to determine the corresponding mapped hashed object fragments determined by the feature mapping. In addition, the feature mapping is stored in a local table 712 that is used by the Mapping Module 708.

Referring to FIG. 7, an object node 750 can have an Object Table Module 752 that receives Object Messages and Insert Object Messages from a communication module 754. In the case of an Object Message, the Object Table module 752 retrieves an entry in a local table 756 using the object identifier in the OID field of the Object Message. The Object Message and the retrieved entry are transmitted to the Communication Module 754 using an Object Response Message. In the case of an Insert Object Message, the Object Table module 754 inserts a new entry in the local table 754. If an entry already exists for the specified object identifier, then the existing entry is replaced. The new or replacement entry contains the information in the Insert Object Message.

Figure 8:
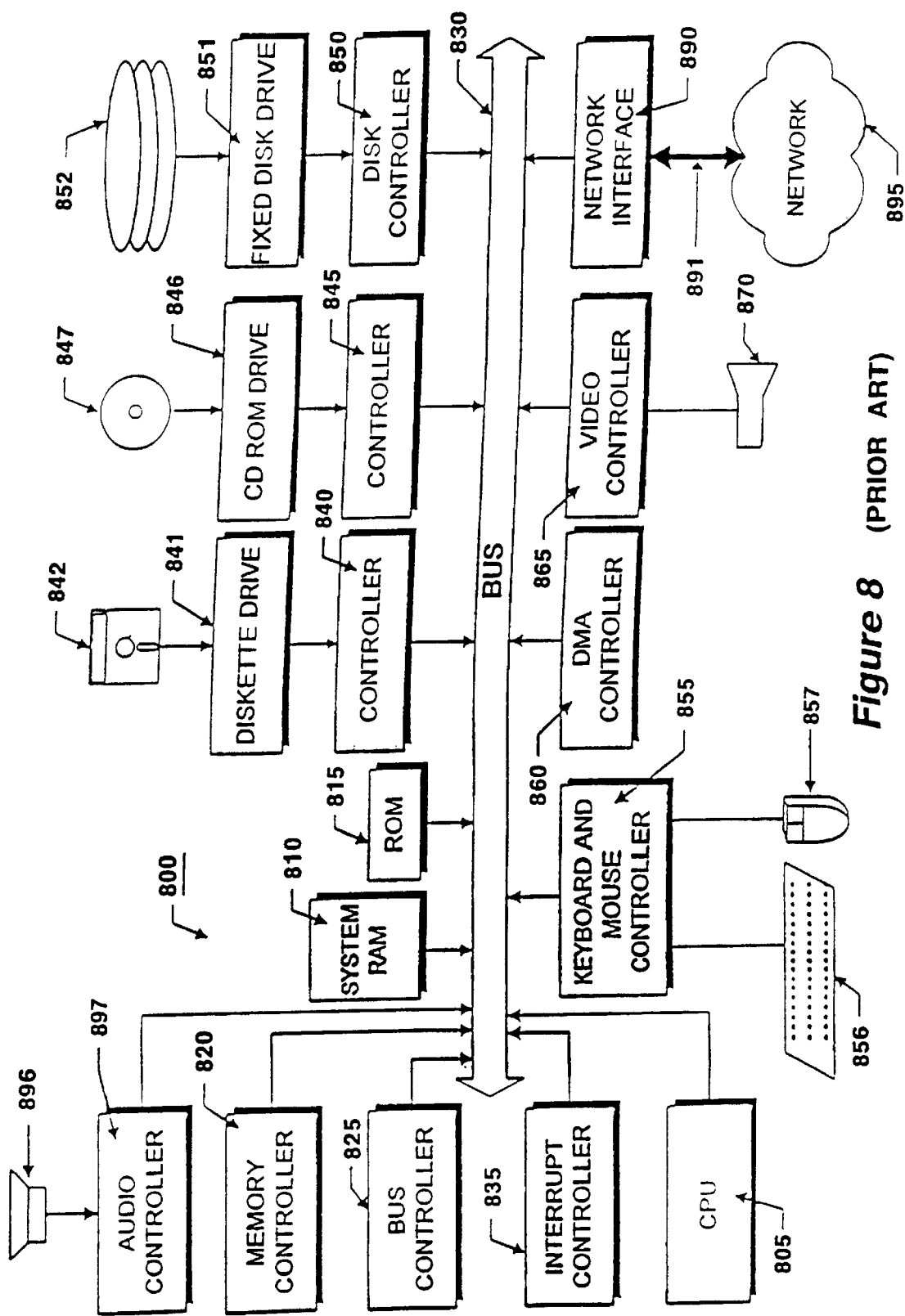
FIG. 8 is a block diagram of a computer system in accordance with an exemplary embodiment of each of the user computer, the front end computer, the home, query, and object nodes, and the external servers.

FIG. 8 illustrates a conventional system architecture for an exemplary computer system 800. Each of the user computer, front end computer and the computer nodes, including the home node, query node, object node, can be implemented as an instance of computer system 800. The exemplary computer system of FIG. 8 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 8.

The computer system 800 includes a central processing unit (CPU) 805, which may include a conventional microprocessor, random access memory (RAM) 810 for temporary storage of information, and read only memory (ROM) 815 for permanent storage of information. A memory controller 820 is provided for controlling system RAM 810. A bus controller 825 is provided for controlling bus 830, and an interrupt controller 835 is used for receiving and processing various interrupt signals from the other system components.

Mass storage may be provided by diskette 842, CD-ROM 847, or hard disk 852. Data and software may be exchanged with client computer 800 via removable media, such as diskette 842 and CD-ROM 847. Diskette 842 is insertable into diskette drive 841, which is connected to bus 830 by controller 840. Similarly, CD-ROM 847 is insertable into CD-ROM drive 846, which is connected to bus 830 by controller 845. Finally, the hard disk 852 is part of a fixed disk drive 851, which is connected to bus 830 by controller 850.

User input to the computer system 800 may be provided by a number of devices. For example, a keyboard 856 and a mouse 857 may be connected to bus 830 by keyboard and mouse controller 855. An audio transducer 896, which may act as both a microphone and a speaker, is connected to bus 830 by audio controller 897. It should be obvious to those reasonably skilled in the art that other input devices, such as a pen and/or tablet and a microphone for voice input, may be connected to client computer 800 through bus 830 and an appropriate controller. DMA controller 860 is provided for performing direct memory access to system RAM 810. A visual display is generated by a video controller 865, which controls video display 870.

Computer system 800 also includes a network adapter 890 that allows the client computer 800 to be interconnected to a network 895 via a bus 891. The network 895, which may be a local area network (LAN), a wide area network (WAN), or the Internet, may utilize general-purpose communication lines that interconnect multiple network devices.

Computer system 800 generally is controlled and coordinated by operating system software. Among other computer system control functions, the operating system controls allocation of system resources and performs tasks such as process scheduling, memory management, networking and I/O services.

A software implementation of components of the above-described embodiment may comprise computer instructions and routines either fixed on a tangible medium, such as a computer-readable media, e.g. the diskette 842, CD-ROM 847, ROM 815, or fixed disk 852 of FIG. 8, or transmittable via a modem or other interface device, such as communications adapter 890 connected to the network 895 over a medium 891. Medium 891 can be either a tangible medium, including but not limited to optical or hard-wire communications lines, or may be implemented with wireless techniques, including but not limited to microwave, infrared or other transmission techniques. It may also be the Internet. When so transmitted, the software components can take the form of a digital signal embodied in a carrier wave. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims. Therefore, the invention should be construed as limited only as indicated by the scope of the claims.

What is claimed is:

1. A method for information retrieval using fuzzy queries in a distributed computer database system having a plurality of home nodes and a plurality of query nodes connected by a network, said method comprising the steps of:

A) selecting a first one of said plurality of home nodes;

B) extracting, by said selected home node, a plurality of features and a plurality of target ontology identifiers from a query by a user;

C) fragmenting the extracted features into query feature fragments;

D) hashing, by said selected home node, each said query feature fragments of said plurality of query features fragment, said hashed query feature fragment having a first portion and a second portion;

E) transmitting, by said selected home node, each said hashed query feature fragment of said plurality of query feature fragments and said plurality of target ontology identifiers to a respective one of said plurality of query nodes indicated by said first portion of each said hashed query feature fragment;

F) using by said query node, said second portion of said respective hashed query feature fragment to access data according to a local hash table located on said query node;

G) using by said query node, said plurality of target ontology identifiers and said accessed data according to said respective hashed query feature fragment, to extract a plurality of hashed feature fragments and a plurality of object identifiers;

H) transmitting, by said query node, each said hashed feature of said plurality of hashed feature fragments and said plurality of target ontology identifiers to a respective one of said plurality of query nodes indicated by said first portion of each said hashed feature; and I) returning, by each said query node accessing data according to said respective hashed feature, a plurality of object identifiers corresponding to said accessed data to said selected home node.

2. The method of claim 1 further comprising the step of receiving, at said home node, said query from said user, prior to the step of extracting features from said query.

3. The method of claim 2 further comprising the steps of:

A) determining, by said home node, a measure of similarity between said accessed data and said query; and B) returning to said user, by said home node, accessed data having a predetermined degree of similarity, subsequent to the step of returning said plurality of object identifiers.

4. The method of claim 3 wherein said measure of similarity is determined by a similarity function based on:

A) features possessed by both the said accessed data and the said query; and

B) features possessed only by the said query.

5. The method of claim 1, wherein the using step comprises using by said query node, said second portion of said respective hashed query feature to access a plurality of object identifiers and a plurality of hashed features according to a local hash table located on said query node, each said object identifier having a first portion and a second portion; and the method further comprises A) transmitting, by said selected home node, each said object identifier of said plurality of object identifiers to a respective one of said plurality of object nodes indicated by said first portion of each said object identifier;

B) using by said object node, said second portion of said respective object node to access data according to a local object table located on said object node; and C) returning, by each said object node accessing data according to said respective object identifier, an object location, and object features to said selected home node.

6. The method of claim 5 further comprising the step of receiving, at said home node, said query from said user, prior to the step of extracting features from said query.

7. The method of claim 6 further comprising the steps of:

A) determining, by said home node, a measure of similarity between said accessed data and said query; and B) returning to said user, by said home node, accessed data having a predetermined degree of similarity, subsequent to the step of returning said object location and auxiliary data.

8. The method of claim 7 wherein said measure of similarity is determined by a similarity function based on:

A) features possessed by both the said accessed data and the said query;

B) features possessed only by the said query; and

C) features possessed only by said accessed data.

9. A method of storing objects or locations of objects in a manner which is conducive to information retrieval using fuzzy queries in a distributed computer database system having a plurality of home nodes and a plurality of query nodes connected by a network, said method comprising the steps of:

A) selecting a first one of said plurality of home nodes;

B) extracting, by said selected home node, a plurality of features from an object submitted by a user;

C) fragmenting the extracted object features into object feature fragments;

D) hashing, by said selected home node, each said object feature fragment of said plurality of object feature fragments, said hashed object feature fragment having a first portion and a second portion;

E) transmitting, by said selected home node, each said hashed object feature fragment of said plurality of hashed feature fragments to a respective one of said plurality of query nodes indicated by said first portion of each said hashed object feature;

F) using, by said query node, said second portion of said respective hashed object feature fragment to store data according to a local hash table located on said query node; and G) applying, by said query node, any applicable ontology mappings to said hashed object feature fragment and storing data in said local hash table located on said query node.

10. The method of claim 9 further comprising the step of receiving, at said home node, said object from said user, prior to the step of extracting features from said object.

11. The method of claim 9 wherein the distributed computer database system includes a plurality of object nodes, and the method further comprises:

A) selecting, by said selected home node, a unique object identifier for an object selected by a user, said object identifier having a first portion and a second portion;

B) using the first portion of said object identifier to select one of said plurality of object nodes;

C) transmitting, by said selected home node, the location of the said object, the said plurality of object features of the said object to a respective one of said plurality of object nodes indicated by said first portion of each object identifier; and D) using, by said object node, said second portion of said object identifier to store data according to a local object table located on said object node.

12. A distributed computer database system having an information retrieval tool for handling queries from a user comprising:

A) a plurality of home nodes; and

B) a plurality of query nodes;

C) said plurality of home nodes and said plurality of query nodes connected by a network;

D) wherein each said home node, upon receiving a query from a user, extracts a plurality of features and a plurality of target ontology identifiers from said query, fragments each said extracted query features into a plurality of query feature fragments, hashes each said query feature fragment of said plurality of query feature fragments into a hashed query feature fragment having a first portion and a second portion, and transmits each said hashed query feature fragment and said plurality of target ontology identifiers to a respective one of said plurality of query nodes indicated by said first portion of said hashed query feature fragment, E) wherein each said query node uses said second portion of said hashed query feature fragment to access data according to a local hash table located on said query node, F) further wherein each said query node uses said plurality of target ontology identifiers and said accessed data to extract a plurality of hashed feature fragments and a plurality of object identifiers, and transmits each said hashed feature fragment of said plurality of hashed features and said plurality of target ontology identifiers to a respective one of said plurality of query nodes indicated by said first portion of said hashed feature, and returns said plurality of object identifiers corresponding to said accessed data to said home node.

13. The distributed computer database system of claim 12 wherein said home node determines a measure of similarity between said accessed data and said query and returns to said user accessed data having a predetermined degree of similarity.

14. The distributed computer database system of claim 13 wherein said home node measures similarity using a similarity function determined by:
   A) features possessed by both the said accessed data and the said query; and
   B) features possessed only by the said query.

15. A distributed computer database system for storage and retrieval of information objects or locations of information objects, comprising
   A) plurality of home nodes; and
   B) a plurality of query nodes;
   C) said plurality of home nodes and said plurality of query nodes connected by a network;
   D) wherein each said home node, upon receiving an object from a user, extracts a plurality of features from said object, fragments each said feature into a plurality of object feature fragments, hashes each said object feature fragment of said plurality of object feature fragments into a hashed object feature fragment having a first portion and a second portion, and transmits each said hashed object feature fragment to a respective one of said plurality of query nodes indicated by said first portion of said hashed object feature fragment, and
   E) wherein each said query node uses said second portion of said hashed object feature fragment to store objects or locations of objects and hashed feature fragments defined by ontology mappings, according to a local hash table located on said query node.

16. A distributed computer database system having an information retrieval tool for handling queries from a user, comprising:
   A) a plurality of home nodes; and
   B) a plurality of query nodes;
   C) said plurality of home nodes and said plurality of query nodes connected by a network;
   D) each said home node, upon receiving a command from a user, enqueuing a predetermined task in response to said command,
   E) a query task enqueued being resultant in, in response to a query command from said user, extracting a plurality of features and a plurality of target ontology identifiers from a query contained in said query command, fragmenting each said feature into a query feature fragment, hashing each said query feature fragment of said plurality of query feature fragments into a hashed query feature fragment having a first portion and a second portion, and transmitting a query message containing each said hashed query feature fragment and said plurality of target ontology identifiers to a respective one of said plurality of query nodes indicated by said first portion of said hashed query feature fragment,
   F) said query node, upon receipt of said query message, using said second portion of said hashed query feature fragment to access data according to a local hash table located on said query node, said data being composed of a plurality of object identifiers and a plurality of hashed feature fragments, transmitting a message returning a plurality of object identifiers corresponding to said accessed data to said home node, and for each hashed feature fragment of said plurality of hashed feature fragments, transmitting a message containing said hashed feature fragment and said plurality of target ontology identifiers to a respective one of said plurality of query nodes indicated by said first portion of said hashed feature fragment.

17. A distributed computer database system for storage and retrieval of information, comprising:
   A) a plurality of home nodes; and
   B) a plurality of query nodes; p1 C) said plurality of home nodes and said plurality of query nodes connected by a network;
   D) each said home node, upon receiving a command from a user, enqueuing a predetermined task in response to said command,
   E) an insert task enqueued, in response to an insert command from said user, extracting a plurality of features from an object contained in said insert command, fragmenting each said object feature into a plurality of object feature fragment; hashing each said object feature fragment of said plurality of object feature fragments into a hashed object feature fragment having a first portion and a second portion, and transmitting an insert message containing each said hashed object feature fragment to a respective one of said plurality of query nodes indicated by said first portion of said hashed object feature fragment,
   F) said query node, upon receipt of said insert message, using said second portion of said hashed object feature fragment to store data according to a local hash table located on said query node, and using any ontology mappings applicable to said hashed object feature fragment to store data in said local hash table located on said query node.

18. A method of storing ontology mappings in a manner which is conducive to information retrieval using fuzzy queries, said method comprising the steps of:
   A) transmitting, by a home node, an ontology mapping to a plurality of query nodes;
   B) using, by each said query node, said ontology mapping to map all features to which said ontology mapping is applicable and which are stored in a local hash table located on said query node; and
   C) storing said ontology mapping in a local ontology mapping table located on said query node.

19. The method of claim 18 further comprising the step of receiving, at said home node, said ontology mapping from said user, prior to the step of transmitting said ontology mapping to said home node.

20. A distributed computer database system for storage and retrieval of information objects or locations of information objects, comprising
   A) a home node for receiving an ontology mapping from a user, and transmitting said ontology mapping to a plurality of query nodes, and
   B) each said query node using said ontology mapping to map all features to which said ontology mapping is applicable and which are stored in a local hash table located on said query node, and to store said ontology mapping in a local ontology mapping table located on said query node.

21. A computer program product for processing a query for word based and non-word based retrieval of information from a database, the computer program product comprising a computer-executable program embodied on a computer-readable medium, the computer-executable program comprising:
   A) a first code portion for extracting a number of features and a number of target ontology identifiers from the query;
   B) a second code portion for fragmenting each of the features into a number of feature fragments;
   C) a third code portion for hashing each of the feature fragments into hashed feature fragments; and
   D) a fourth code portion for use in accessing a hash table for obtaining object identifiers therefrom for use in obtaining information from the database that both corresponds to target ontologies identified by the ontology identifiers and is relevant to the query.

22. An information indexing system for indexing information for facilitated retrieval from a database, the system comprising:
   A) a first mechanism for extracting a number of features and a number of target ontology identifiers from the query;
   B) a second mechanism coupledwith the first mechanism for fragmenting each of the features into a number of feature fragments;
   C) a third mechanism coupledwith the second mechanism for hashing each of the feature fragments into hashed feature fragments; and
   D) a fourth mechanism coupled with the third mechanism for accessing a hash table for obtaining object identifiers therefrom for use in obtaining information from the database that both corresponds to target ontologies identified by the ontology identifiers and is relevant to the query.

* * * * *

UNITED STATES PATENT AND TRADEMARK OFFICE
CERTIFICATE OF CORRECTION

PATENT NO.    : 6,424,973 B1
DATED         : July 23, 2002
INVENTOR(S)   : Kenneth P. Baclawski It is certified that error appears in the above-identified patent and that said Letters Patent is hereby corrected as shown below:

Column 20,
Line 31, replace "B) a plurality of query nodes;pl C) said" with
-- B) a plurality of query nodes;
C) said --; and Column 22,
Line 14, replace "coupledwith" with -- coupled with --.

Signed and Sealed this

Nineteenth Day of November, 2002

Attest:

Attesting Officer

JAMES E. ROGAN
*Director of the United States Patent and Trademark Office*